(12) United States Patent
Lee et al.

(10) Patent No.: US 11,497,993 B2
(45) Date of Patent: Nov. 15, 2022

(54) METHOD AND APPARATUS FOR PROVIDING GAME STRATEGY GUIDE

(71) Applicant: Netmarble Corporation, Seoul (KR)

(72) Inventors: Yun Jin Lee, Seoul (KR); Seung Je Park, Seoul (KR)

(73) Assignee: Netmarble Corporation, Seoul (KR)

( * ) Notice: Subject to any disclaimer, the term of this patent is extended or adjusted under 35 U.S.C. 154(b) by 307 days.

(21) Appl. No.: 16/674,326

(22) Filed: Nov. 5, 2019

(65) Prior Publication Data

US 2020/0139239 A1 May 7, 2020

(30) Foreign Application Priority Data

Nov. 7, 2018 (KR) .................. 10-2018-0135975

(51) Int. Cl.
| | | |
|---|---|---|
| A63F 13/00 | (2014.01) | |
| A63F 13/352 | (2014.01) | |
| A63F 13/46 | (2014.01) | |
| A63F 13/58 | (2014.01) | |
| A63F 13/69 | (2014.01) | |
| A63F 13/79 | (2014.01) | |
| A63F 13/822 | (2014.01) | |

(52) U.S. Cl.
CPC .......... *A63F 13/352* (2014.09); *A63F 13/46* (2014.09); *A63F 13/58* (2014.09); *A63F 13/69* (2014.09); *A63F 13/79* (2014.09); *A63F 13/822* (2014.09)

(58) Field of Classification Search
CPC .............. A63F 2300/61; A63F 2011/65; A63F 13/352; A63F 13/46; A63F 13/58
See application file for complete search history.

(56) References Cited

U.S. PATENT DOCUMENTS 10,926,178 B1 * 2/2021 Batty .................... A63F 13/497

FOREIGN PATENT DOCUMENTS

| | | |
|---|---|---|
| JP | 2005-230168 A | 9/2005 |
| JP | 2016-032545 A | 3/2016 |
| KR | 10-0481142 B1 | 3/2005 |
| KR | 2017-0073059 A | 6/2017 |

* cited by examiner

*Primary Examiner* — Milap Shah
*Assistant Examiner* — Jason Pinheiro
(74) *Attorney, Agent, or Firm* — Foley & Lardner LLP

(57) ABSTRACT

A method and apparatus for providing a game strategy guide is provided. The method includes calculating a score associated with an achievement of a game goal based on current state information of a game character of a user, providing a user terminal of the user with a game strategy guide interface including information associated with the calculated score, receiving change information of the current state information from the user terminal, recalculating the score based on the received change information, and transmitting information associated with the recalculated score to the user terminal.

15 Claims, 9 Drawing Sheets

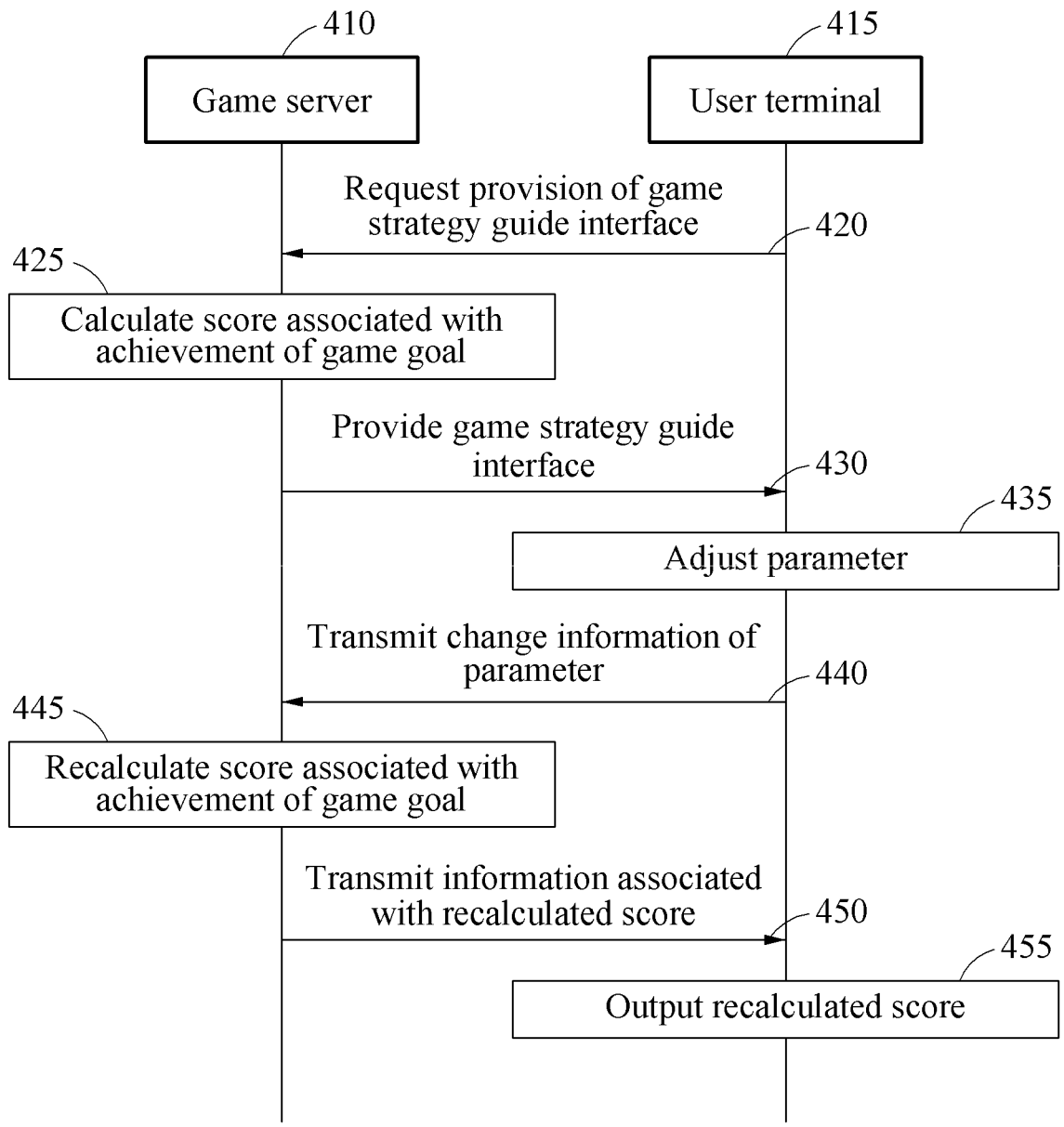

FIG. 7

| Attack power ($x_1$) | Defensive power ($x_2$) | Attack speed ($x_3$) | Life power ($x_4$) | Recovery rate ($x_5$) | Victory (y) |
|---|---|---|---|---|---|
| 0.6 | 0.6 | 0.2 | 0.5 | 0.2 | 1 |
| 0.4 | 0.7 | 0.3 | 0.1 | 0.3 | 1 |
| 0.5 | 0.6 | 0.2 | 0.2 | 0.2 | 1 |
| 0.1 | 0.2 | 0.1 | 0.3 | 0.6 | 0 |
| 0.2 | 0.1 | 0.1 | 0.2 | 0.5 | 0 |

METHOD AND APPARATUS FOR PROVIDING GAME STRATEGY GUIDE

CROSS-REFERENCE TO RELATED APPLICATION(S)

This application claims the priority benefit of Korean Patent Application No. 10-2018-0135975 filed on Nov. 7, 2018, in the Korean Intellectual Property Office, the disclosure of which is incorporated herein by reference for all purposes.

BACKGROUND

1. Field

One or more example embodiments relate to a method and apparatus for providing a game strategy guide.

2. Description of Related Art

As performance of a wireless terminal device, such as, for example, a laptop computer and a smartphone, increases, a game user has been able to enjoy a game regardless of time and space. There is a growing number of game users who enjoy games, and a game industry continues making progress accordingly. In addition, game contents are increasing and more diversified, and thus a game-playing method is becoming more complicated. As a game-playing method is more complicated, a tutorial mode is generally used to provide a game user with a guide to how to play a game at an initial game-playing stage, in order to increase game users' accessibility to the game. Such tutorial mode may allow a game user to learn more easily about how to play a game which is not yet familiar to the game user.

SUMMARY

According to an example embodiment, there is provided a method of providing a game strategy guide, the method including providing a user with a game strategy guide interface including at least one adjustable parameter, receiving the parameter adjusted by a user input of the user, calculating a score associated with an achievement of a game goal based on the adjusted parameter, and providing the user with information associated with the calculated score through the game strategy guide interface.

When the parameter is adjusted by the user input, the game strategy guide interface may provide information associated with a change in a probability index indicating a probability of the achievement of the game goal based on the adjusted parameter.

The providing of the game strategy guide interface may include calculating the score associated with the achievement of the game goal based on current state information of a game character of the user, and providing the user with the game strategy guide interface including the information associated with the calculated score.

When state information of the game character of the user changes by the user input, the calculating of the score may include calculating the score based on the changed state information.

The calculating of the score may include calculating the score by applying the adjusted parameter to a pretrained multiple linear regression (MLR) model.

The calculating of the score may include selecting an MLR model corresponding to the game character of the user from among a plurality of pretrained MLR models, and calculating the score by applying the adjusted parameter to the selected MLR model.

The game strategy guide interface may indicate therein the current state information of the game character of the user. The current state information of the game character may include information associated with at least one of an ability or an attribute of the game character.

The game strategy guide interface may include a select icon for a connection to a change interface through which the current state information of the game character may be changed.

The select icon may include select icons respectively corresponding to one or more abilities and one or more attributes of the game character.

The parameter may be associated with the achievement of the game goal, and be a parameter that determines an ability of the game character of the user.

The game strategy guide interface may include at least one parameter selected from among a plurality of adjustable parameters based on a level of influence on the achievement of the game goal.

The achievement of the game goal may include one of a completion of a game quest, a completion of a game mission, a success in a raid, a victory against a boss character, and a victory against a game character of another user.

The score may indicate a probability value of a probability of achieving the game goal.

According to another example embodiment, there is provided a method of providing a game strategy guide, the method including calculating a score associated with an achievement of a game goal based on current state information of a game character of a user, providing a user terminal of the user with a game strategy guide interface including information associated with the calculated score, receiving change information of the current state information from the user terminal, recalculating the score based on the received change information, and transmitting information associated with the recalculated score to the user terminal.

The game strategy guide interface may include at least one adjustable parameter associated with the achievement of the game goal. When the parameter is adjusted by the change information, the game strategy guide interface may provide information associated with a change in a probability index indicating a probability of the achievement of the game goal based on the adjusted parameter.

The game strategy guide interface may include at least one adjustable parameter, and the calculating of the score may include calculating the score based on the parameter.

The recalculating of the score may include recalculating the score by applying a parameter included in the change information to a pretrained MLR model.

The game strategy guide interface may indicate therein the current state information of the game character of the user.

The current state information of the game character may include information associated with at least one of an ability or an attribute of the game character.

According to still another example embodiment, there is provided an apparatus for providing a game strategy guide, the apparatus including a memory and a processor. The memory may be configured to store instructions executable by the processor. When the instructions are executed by the processor, the processor may be configured to provide a user with a game strategy guide interface including at least one adjustable parameter, receive the parameter adjusted by a user input of the user, calculate a score associated with an achievement of a game goal based on the adjusted parameter, and provide the user with information associated with the calculated score through the game strategy guide interface.

The processor may calculate the score associated with the achievement of the game goal based on current state information of a game character of the user, and provide the user with the game strategy guide interface including the information associated with the calculated score.

The processor may select an MLR model corresponding to the game character of the user from among a plurality of pretrained MLR models, and calculate the score by applying the adjusted parameter to the selected MLR model.

According to yet another example embodiment, there is provided an apparatus for providing a game strategy guide, the apparatus including a memory and a processor. The memory may be configured to store instructions executable by the processor. When the instructions are executed by the processor, the processor may be configured to calculate a score associated with an achievement of a game goal based on current state information of a game character of a user, providing a user terminal of the user with a game strategy guide interface including information associated with the calculated score, receive change information of the current state information from the user terminal, recalculate the score based on the received change information, and transmit information associated with the recalculated score to the user terminal.

The game strategy guide interface may include at least one adjustable parameter, and the processor may calculate the score based on the parameter.

The processor may recalculate the score by applying a parameter included in the change information to a pretrained MLR model.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 4 is a diagram illustrating an example of a method of providing a game strategy guide to be performed between a game server and a user terminal according to an example embodiment;

FIG. 7 is a diagram illustrating an example of a process of training a multiple linear regression (MLR) model according to an example embodiment;

DETAILED DESCRIPTION

Figure 1:
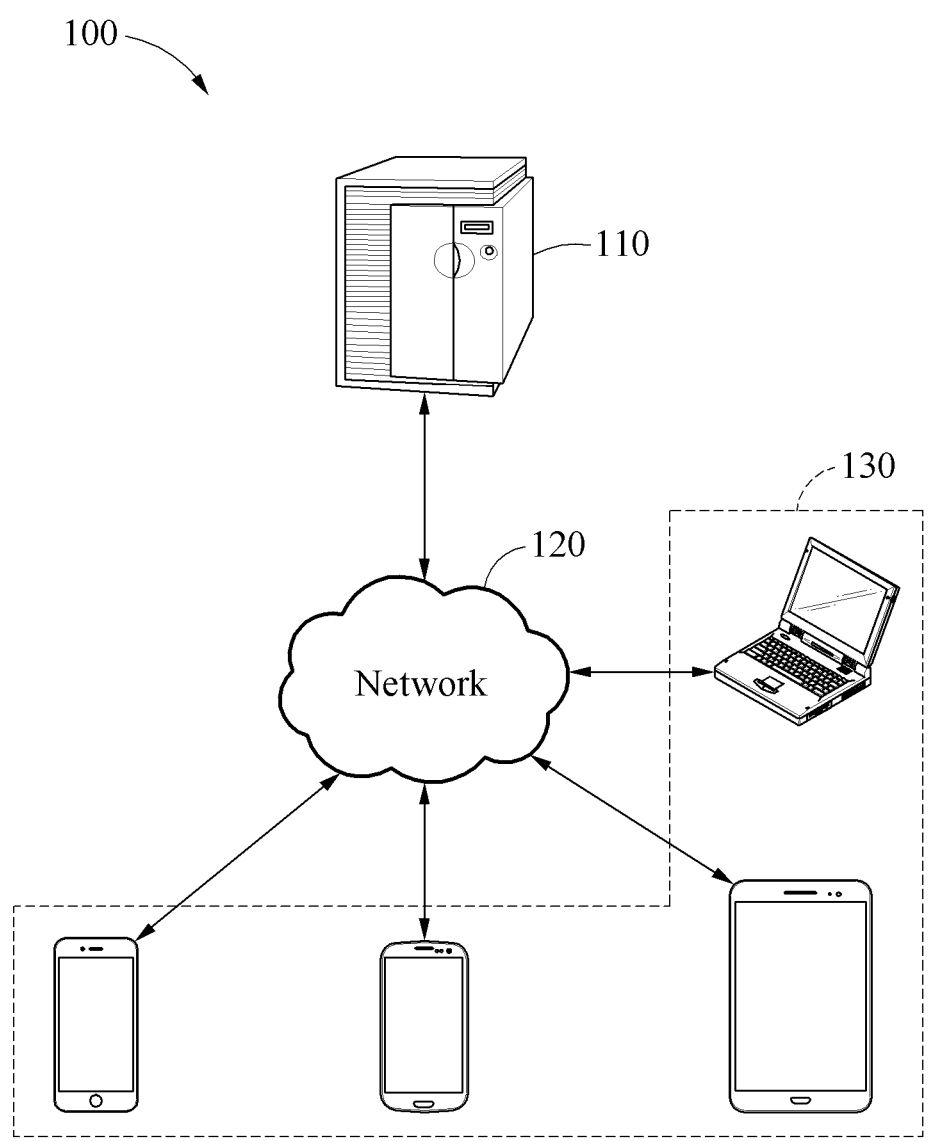
FIG. 1 is a diagram illustrating an example of a game system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of a game system according to an example embodiment.

Referring to FIG. 1, a game system 100 may provide a game service to a plurality of user terminals 130 through a game server 110. The game system 100 includes the game server 110, the user terminals 130, and a network 120. The game server 110 and the user terminals 130 may communicate with each other through the network 120, for example, the Internet, a wired or wireless local area network, a wide area data network, and the like.

The game server 110 may perform a verification process on a user terminal among the user terminals 130 that requests access to execute a game program, and provide the game service to the user terminal for which verification is completed through the verification process.

A user who desires to play a game may execute a game program or a game application installed in a user terminal of the user, and request access to the game server 110. Here, the user terminal described herein may be a computing device, such as, for example, a cellular phone, a smartphone, a personal computer (PC), a laptop computer, a netbook, a tablet PC, and a personal digital assistant (PDA), which enables the user to have access to or be connected to the game through online access. The user may also be referred to herein as a game user who plays game, and the user terminal may also be referred to herein as a game client.

The user terminal may maintain a connection to the game server 110 through the network 120. The game program of the user terminal may transmit, to the game server 110, game control information or game play information associated with an event (e.g., a movement of a game character, an acquisition of an item, a selection of a skill, a change of an item, and a participation or a fight in a war or a battle) that occurs while the user is playing the game, such that the game server 110 may apply the event to a user terminal of another user. The game server 110 may receive various sets of the game control information or the game play information from the user terminals 130, and store the received sets of the game control information or the game play information in a database (DB). Through the game control information, the game server 110 may provide a synchronized game service to users who play the game at the same time.

The game server 110 may include an apparatus for providing a game strategy guide (hereinafter simply referred to as a game strategy guide providing apparatus) that is configured to provide a user with a game strategy guide interface. The game strategy guide interface may include at least one adjustable parameter associated with an achievement of a game goal. When the parameter is adjusted by a user input of the user, the game strategy guide interface may provide information associated with a change in a probability index of a probability of achieving the game goal based on the adjusted parameter.

For example, through the game strategy guide interface, the user may adjust an ability of a game character of the user, and receive information associated with a result of predicting whether the game goal the user desires to achieve is achievable by the adjusted ability or information associated with a probability of achieving the game goal by the adjusted ability. Through the game strategy guide interface, the user may readily determine a method of growing the game character of the user, an ability of the game character that needs to be improved, or an item that needs to be worn or installed on the game character, to achieve the game goal. Thus, it is possible to prevent a user from having difficulty in playing a game due to a continued failure in a certain game stage or a death of a game character of the user, and thus from leaving the game.

A game character used herein refers to an imaginary or virtual character appearing in a game space, or a virtual space, in which a game is played. The game character may be controlled by an individual user, and be a main character that performs an action in the game. The game character may be visualized as a two-dimensional (2D) or three-dimensional (3D) graphics image. The present disclosure may be applicable to a PC-based game program or a video console-based game program, in addition to the game system 100 based on the network 120 as illustrated in FIG. 1.

Hereinafter, a game strategy guide providing apparatus, and a method of providing a game strategy guide (hereinafter simply referred to as a game strategy guide providing method) that is performed by the game strategy guide providing apparatus will be described in detail.

Figure 2:
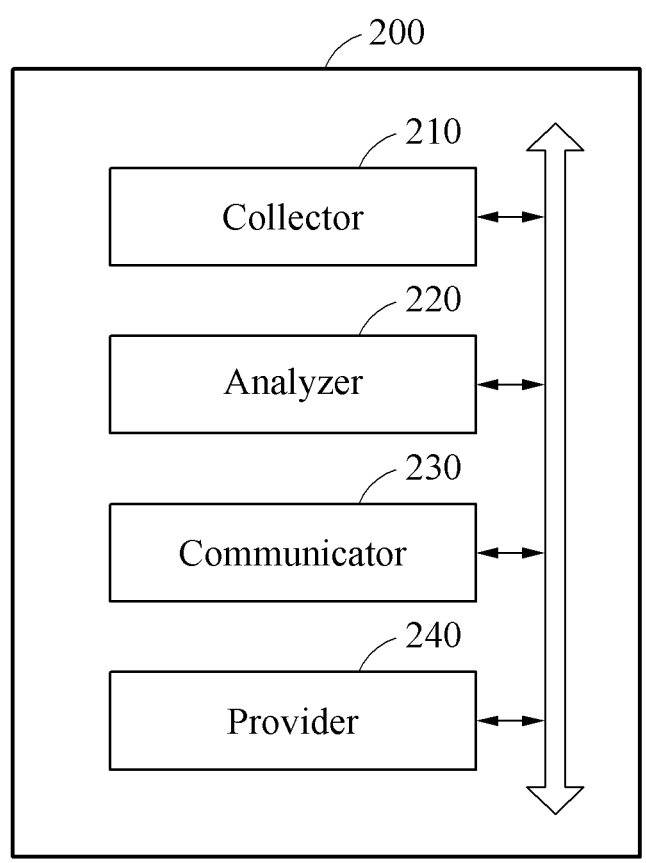
FIG. 2 is a diagram illustrating an example of a configuration of an apparatus for providing a game strategy guide according to an example embodiment.

FIG. 2 is a diagram illustrating an example of a configuration of a game strategy guide providing apparatus according to an example embodiment.

Referring to FIG. 2, a game strategy guide providing apparatus 200 may provide a user with a diagnosis/strategy guide for a challenge or a victory in a game through a game strategy guide interface. Through the game strategy guide interface, the user may predict a probability of a completion of a certain game stage or a probability of a victory against a target object while the user is playing the game.

The game strategy guide providing apparatus 200 may analyze or diagnose a current state of a game character of the user for an achievement of a game goal given in the game. The game strategy guide providing apparatus 200 may then guide the user to how to achieve the game goal through the game strategy guide interface based on a result of the analyzing. For example, the game strategy guide providing apparatus 200 may provide information as to how the user achieves the game goal by, for example, allowing the user to adjust parameters for items configuring an ability of the game character of the user, and to plan a strategy on which item needs to increase to which level. The game goal may include, for example, to succeed in completing a mission in a game stage and to win a victory against a target object. For example, when a parameter associated with an ability of the game character that appears in the game strategy guide interface is adjusted by the user, the game strategy guide providing apparatus 200 may provide the user with information associated with a change in a probability of achieving the game goal based on the adjusted parameter.

As described above, the game strategy guide providing apparatus 200 may provide the user with the game strategy guide interface. For example, when the user fails in a mission in a game stage while the user is playing the game, the user is defeated by a target object, or the user comes to a decision that clearing a game stage is impossible with a current state of the game character of the user, the game strategy guide providing apparatus 200 may provide the user with a game strategy guide that is effective in such case through the game strategy guide interface. Thus, through the game strategy guide interface, the user may learn about how to effectively grow or improve the game character to achieve the game goal.

For example, when, although an attack power of the game character is sufficiently great to achieve the game goal, an attribute of the game character or character compatibility is disadvantageous compared to an attribute of a target object, the game goal may not be achieved. In this example, by changing the attribute of the game character in a current state, or increasing a certain ability of the game character, the probability of achieving the game goal may increase. In addition, using a certain item in this example, the probability of achieving the game goal may also increase.

Through the game strategy guide interface, the game strategy guide providing apparatus 200 may provide the user with the probability of the achievement of the game goal (e.g., an achievement of a certain goal or target and a victory in a battle), along with information associated with the current state of the game character. In addition, the game strategy guide providing apparatus 200 may inform the user of an item that has a great influence on the achievement of the game goal among items of the ability of the game character. Through the game strategy guide interface, the user may then adjust a parameter of each of the items of the ability of the game character, and learn about what item needs to grow to what level or what item needs to be changed to increase the probability of achieving the game goal. Thus, the user may effectively establish a goal or target for growing or improving the game character of the user.

In addition, the game strategy guide providing apparatus 200 may provide the user with a detailed strategy guide to help the user to achieve the game goal, and thus the user may easily test or simulate conditions for the achievement of the game goal and readily verify the conditions for the achievement of the game goal. Thus, the user may be more readily achieve the game goal through the game strategy guide interface. Thus, it is possible to prevent the user from leaving the game due to a difficulty in achieving the game goal while the user is playing the game.

Referring to FIG. 2, the game strategy guide providing apparatus 200 includes a collector 210, an analyzer 220, a communicator 230, and a provider 240. The game strategy guide providing apparatus 200 may be included in the game server 110 of FIG. 1 to operate therein. In an example, respective functions or operations of the collector 210, the analyzer 220, and the provider 240 may be performed by a processor 810 to be described hereinafter with reference to FIG. 8, and a function or operation of the communicator 230 may be performed by a communication interface 830 to be described hereinafter with reference to FIG. 8.

The collector 210 may collect game play information of users who play a same game. The game play information may include, for example, information associated with respective game characters of the users, information as to whether a user completes or achieves a mission in each game stage of the game, information associated with a result of a fight with a counterpart target object, information associated with a counterpart target object, and the like.

The analyzer 220 may analyze the collected game play information, and generate a model configured to calculate a score associated with an achievement of a game goal based on a result of the analyzing. For example, the analyzer 220 may obtain the model to calculate the score by training a multiple linear regression (MLR) model based on the game play information. The trained MLR model may output a score associated with an achievement of a game goal based on an input attribute of a game character. The score may indicate, for example, a probability value or a probability index indicating a probability of the achievement of the game goal, and be included in a game strategy guide interface to be provided to a user terminal.

In addition, when a user requests the game strategy guide interface, the analyzer 220 may analyze game play information including game character information of a game character of the user, and calculate a score associated with an achievement of a game goal of the user. For example, the analyzer 220 may represent an ability of the game character of the user as a numerical value, and calculate a probability of a victory of the game character in a fight with a counterpart target object based on such numerically represented ability value of the game character. The analyzer 220 may calculate the score by applying the ability value of the game character of the user to a pretrained MLR model.

In addition, when state information of the game character of the user changes by a user input made by the user, the analyzer 220 may calculate the score based on the changed state information. For example, when the user changes an installed or equipped item worn on the game character, for example, weapons, defensive tools, and accessories, or the user adjusts the ability value of the game character, and thus the state information of the game character of the user changes, the analyzer 220 may recalculate the score based on the changed state information.

The communicator 230 may transmit and receive, to and from the user terminal, various sets of data related to a game. For example, the communicator 230 may receive data of a user input from the user terminal, and transmit information associated with the game strategy guide interface to the user terminal.

The provider 240 may generate the game strategy guide interface including the score calculated by the analyzer 220, and provide the generated game strategy guide interface. In an example, the game strategy guide interface may initially include information associated with a current ability value of the game character of the user and a score calculated based on the current ability value. When the user adjusts the ability value of the game character afterwards, the game strategy guide interface may indicate therein a score calculated based on the adjusted ability value.

For example, the game strategy guide interface may analyze or diagnose a current state of the game character, in addition to a probability value of a success or a victory in a game goal such as, for example, a certain content in a game (e.g., a dungeon, a fight with a boss character, a raid, a fight with an upper ranker, and a game quest). The game strategy guide interface may then show the user information associated with a result of the analyzing or diagnosing. In addition, the game strategy guide interface may show the user information as to how to increase the probability value, for example, what item of the game character needs to increase by what level, or which portion needs to change. Through this, the user may able to readily determine or plan a strategy to achieve the game goal.

Figure 3:
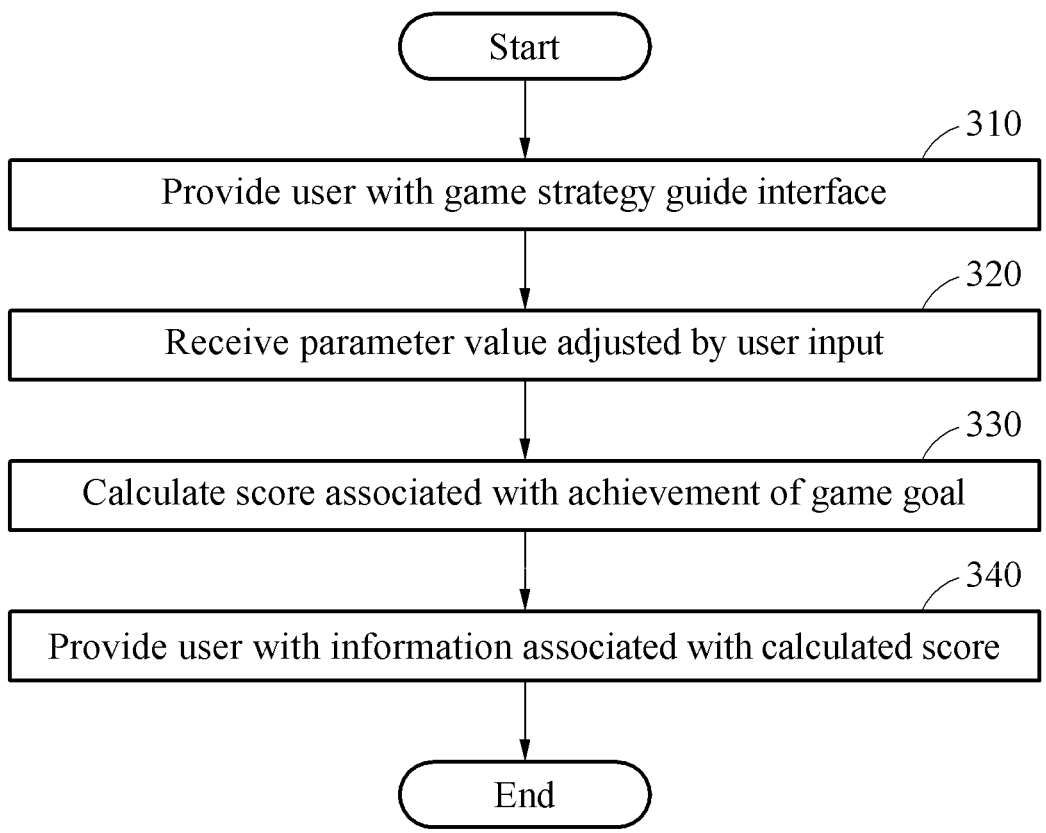
FIG. 3 is a flowchart illustrating an example of a method of providing a game strategy guide according to an example embodiment.

FIG. 3 is a flowchart illustrating an example of a game strategy guide providing method according to an example embodiment. The game strategy guide providing method may be performed by a game strategy guide providing apparatus described herein.

Referring to FIG. 3, in operation 310, the game strategy guide providing apparatus provides a user with a game strategy guide interface including at least one adjustable parameter. Here, the parameter may be associated with an achievement of a game goal, and determine an ability or an ability value of a game character of the user. The parameter may include, for example, an attack power, a defensive power, an attack speed, and a recovery rate, and the like.

In an example, the game strategy guide interface may include all or a portion of parameters that have influence on the achievement of the game goal. In this example, when the game strategy guide interface includes only a portion of the parameters, the game strategy guide interface may include at least one parameter selected from a plurality of adjustable parameters based on a level of influence on the achievement of the game goal. For example, the game strategy guide interface may include a preset number of parameters in order of a higher level of influence on the achievement of the game goal.

The game strategy guide interface that is initially provided to the user may indicate therein current state information of the game character of the user. The current state information of the game character may include information associated with at least one of an ability or an attribute of the game character. The ability and the attribute may correspond to the adjustable parameter. The game strategy guide providing apparatus may calculate a score associated with the achievement of the game goal based on the current state information of the game character, and provide the user with the game strategy guide interface including information associated with the calculated score.

In an example, the game strategy guide interface may include a select icon for a connection to a change interface that allows the user to change the current state information of the game character. For example, the game strategy guide interface may include the select icon that enables the connection to an interface that allows the user to change an installed or equipped item worn on the game character, or upgrade or downgrade the ability of the game character. The select icon may include select icons respectively corresponding to one or more ability values and one or more attributes of the game character.

In operation 320, the game strategy guide providing apparatus receives the parameter adjusted by a user input of the user. The user may adjust the ability or the attribute of the game character of the user in the game strategy guide interface, and the adjusted parameter indicating the adjusted ability or attribute may be transmitted from a user terminal of the user to the game strategy guide providing apparatus. For example, the user may directly adjust at least one of parameters in the game strategy guide interface, or a parameter may be automatically adjusted or changed when an installed or equipped item worn on the game character is changed.

In operation 330, the game strategy guide providing apparatus calculates the score associated with the achievement of the game goal based on the adjusted parameter. The achievement of the game goal may be one of, for example, a completion of a game quest, a completion of a game mission, a success in a raid, a victory against a boss character, and a victory against a game character of another user. The score may indicate a probability value indicating a probability of achieving the game goal, and be used as a basis to estimate a probability of a victory, a probability of an achievement of a goal, and the like.

In an example, the game strategy guide providing apparatus may calculate the score by applying, to a pretrained MLR model, the parameter adjusted by the user input. In another example, there may be a plurality of MLR models pretrained based on an attribute of a game character, for example, a level and an occupation. In this example, the game strategy guide providing apparatus may select an MLR model corresponding the game character of the user from among the pretrained MLR models, and calculate the score by applying, to the selected MLR model, the parameter adjusted by the user input.

In operation 340, the game strategy guide providing apparatus provides the user with information associated with the score calculated in operation 330 through the game strategy guide interface. The game strategy guide interface may indicate therein the score calculated based on the adjusted parameter along with a result of adjusting the parameter by the user input. As described above, the game strategy guide providing apparatus may provide the user with a detailed strategy guide to enable the user to achieve the game goal.

In an example, when state information of the game character is changed by the user input, the game strategy guide providing apparatus may recalculate the score based on the changed state information of the game character, and apply the recalculated score to the game strategy guide interface. Through this, the user may readily predict a change in a probability of the achievement of the game goal, in association with an ability of the game character to be changed and an amount by which the ability is changed. Thus, the user may easily test or simulate conditions for the achievement of the game goal, and thus the user may readily achieve the game goal. Thus, it is possible to prevent a user from leaving a game due to a difficulty in an achievement of a game goal while the user is playing the game.

FIG. 4 is a diagram illustrating an example of a game strategy guide providing method to be performed between a game server and a user terminal according to an example embodiment. In the example of FIG. 4, a game server 410 may include a game strategy guide providing apparatus.

Referring to FIG. 4, in operation 420, a user terminal 415 controlled by a user transmits, to the game server 410, a request for provision of a game strategy guide interface. For example, the user may select an icon that enables the request for the game strategy guide interface from a game screen or display, and the request for the game strategy guide interface may be transmitted from the user terminal 415 to the game server 410 by such an action of selecting the icon by the user.

In operation 425, when the game server 410 receives the request for the game strategy guide interface from the user terminal 415, the game server 410 calculates a score associated with an achievement of a game goal based on current state information of a game character of the user. For example, the game server 410 may estimate a probability of achieving the game goal when the user plays a game with the game character based on the current state information of the game character, and determine the estimated probability to be the score. For example, the game server 410 may calculate the score by applying the current state information of the game character to a pretrained MLR model, for example.

In operation 430, the game server 410 provides the user terminal 415 with the game strategy guide interface including information associated with the score calculated in operation 425. The game strategy guide interface to be provided may include the current state information of the game character of the user, in addition to the information associated with the score. The current state information may include, for example, information associated with an ability or an attribute of the game character. The game strategy guide interface may include at least one adjustable parameter associated with the ability or the attribute of the game character. The score in the game strategy guide interface may be calculated based on at least one parameter.

In operation 435, when the user terminal 415 receives the game strategy guide interface, the user terminal 415 adjusts the parameter in the game strategy guide interface. The user may adjust the parameter in the game strategy guide interface to have an optimal condition for the game character to achieve the game goal.

In operation 440, the user terminal 415 transmits, to the game server 410, change information of the parameter. Here, the change information of the parameter may indicate information associated with the parameter adjusted by a user input of the user. In operation 445, when the game server 410 receives the change information, the game server 410 recalculates the score associated with the achievement of the game goal based on the received change information. The game server 410 may recalculate the score by applying, to the MLR model used in operation 425, the parameter included in the change information.

In operation 450, the game server 410 transmits, to the user terminal 415, information associated with the score recalculated in operation 445. In operation 455, the user terminal 415 outputs, through the game strategy guide interface, the recalculated score based on the information associated with the recalculated score and received from the game server 410. Thus, the user may identify an effective method to achieve the game goal based on a change in the score by a result of adjusting the parameter.

Figure 5A:
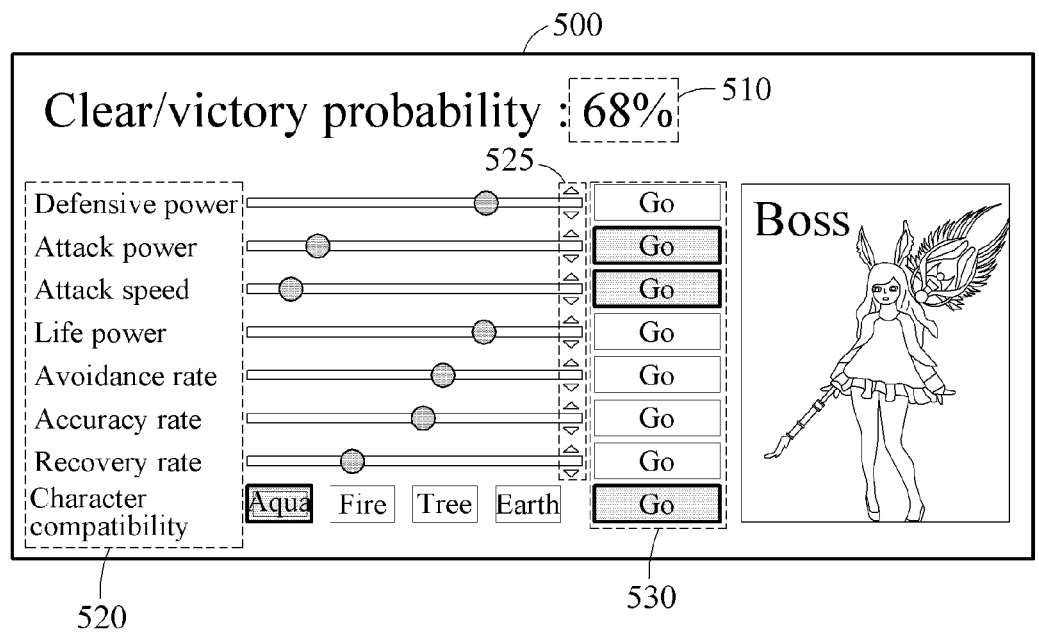
FIGS. 5A and 5B are diagrams illustrating an example of a game strategy guide interface according to an example embodiment.
Figure 5B:
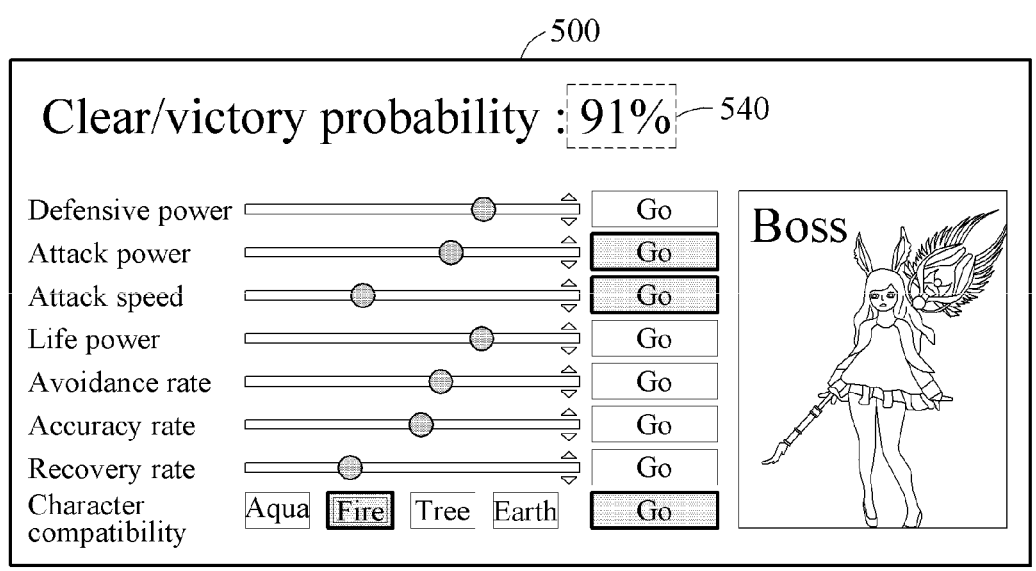

FIGS. 5A and 5B are diagrams illustrating an example of a game strategy guide interface according to an example embodiment In the example of FIG. 5A, a game strategy guide interface 500 displayed on a screen of a user terminal is illustrated. The game strategy guide interface 500 indicates or displays state information 520 of a game character of a user of the user terminal, and a score 510 calculated based on the state information 520. The state information 520 may include information associated with an ability or an attribute of the game character, for example, a defensive power, an attack power, a life power, a recovery rate, and character compatibility. Through the game strategy guide interface 500, the user may analyze or diagnose a current state of the game character to achieve the game goal. In an example, the game strategy guide interface 500 may select and display items or elements having a higher level of influence on the achievement of the game goal. In an example, the score 510 may be determined based on a result of applying values of the state information 520 to a pretrained MLR model.

The user may adjust a value of a detailed item in the state information 520 displayed on the game strategy guide interface 500 using an adjustment bar 525. For example, as illustrated in FIG. 5B, the user may adjust a value of the attack power and a value of the attack speed using the adjustment bar 525. In addition, the user may change character compatibility of the game character. When a value of a detailed item and/or an attribute of the game character changes as illustrated, a score may be recalculated based on related changed information, a calculated score 540 may be displayed on the game strategy guide interface 500 as illustrated in FIG. 5B. By adjusting the attack power, the attack speed, and the character compatibility, a clear/victory probability of the game character increases from 68% to 91% as illustrated in FIGS. 5A and 5B. Thus, the user may adjust a value of a detailed item, and determine what ability of the game character needs to increase by what level or value, in order to increase the probability of the achievement of the game goal.

The game strategy guide interface 500 may provide the user with a score, for example, the score 510, including probability information indicating a probability of an achievement of a game goal or target (e.g., a completion of a game quest, a completion of a game mission, a success in a raid, a victory against a boss character, a victory against another game character of another user, and the like) in a certain content of a game. The user may then verify a change in the probability of the achievement of the game goal by adjusting each detailed item. Thus, the user may readily recognize which portion of the game character needs to increase to achieve the game goal. The user may thus determine or plan a strategy to effectively improve or grow the game character of the user.

Figure 6:
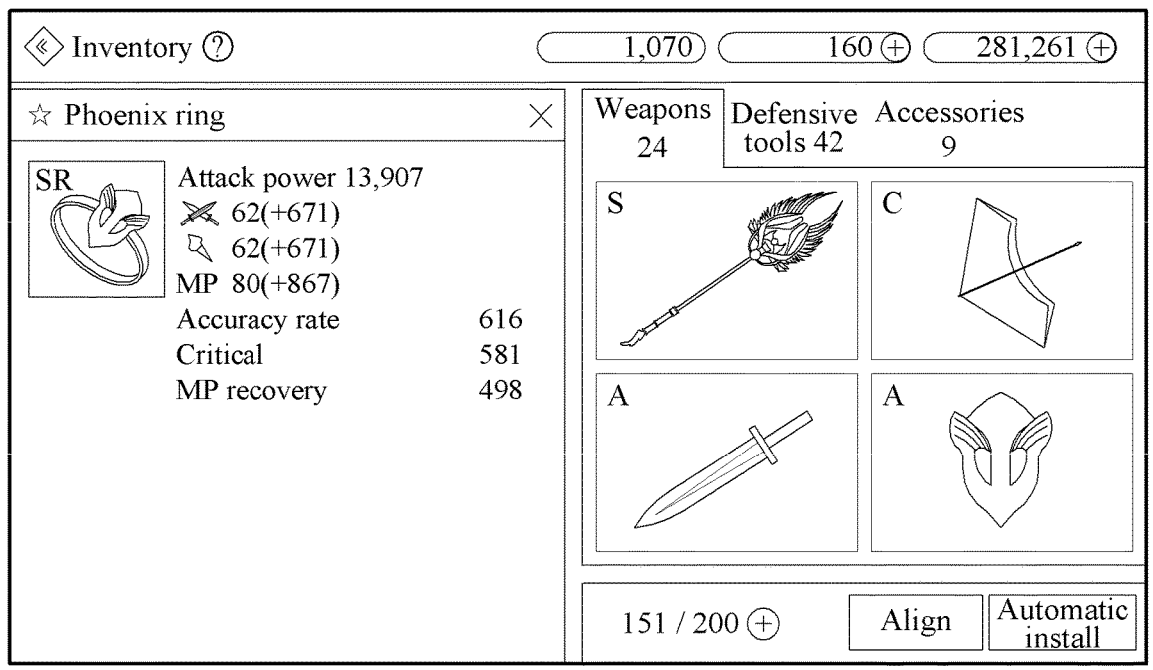
FIG. 6 is a diagram illustrating an example of an inventory window of a game character according to an example embodiment.

Referring back to FIG. 5A, the game strategy guide interface 500 further includes a select icon 530 to allow the user to change a value of each detailed item of the state information 520. When the user selects the select icon 530, the user may be connected to an inventory window of the game character as illustrated in FIG. 6, or to an interface for strengthening an ability of the game character. The user may change an already installed or equipped item of the game character, or additionally equip the game character with another item, in the inventory window. Through this, the current state information 520 of the game character may change. A score may then be recalculated based on the changed current state information, and the recalculated score may be displayed on the game strategy guide interface 500. As illustrated in FIG. 5A, the select icon 530 may be displayed for a relatively weak ability of the game character among abilities of the game character, or distinguishably displayed for the weak ability.

Alternatively, the game strategy guide providing apparatus may have in advance information associated with an average score required for an achievement of each game goal based on a score calculated with respect to game characters of other users and on whether the users achieve a game goal. The game strategy guide providing apparatus may provide the user with a score required to achieve a certain game goal based on the information associated with the average score, through the game strategy guide interface 500.

FIG. 7 is a diagram illustrating an example of a process of training an MLR model according to an example embodiment.

In an example, a game strategy guide providing apparatus may use an MLR model to calculate a score, and such MLR model may be trained based on numerical information as illustrated in FIG. 7. The game strategy guide providing apparatus may represent, as numerical values, all items that may affect an achievement of a game goal. For example, an attack power, equipment, occupation, character compatibility, a skill, an attack range, an item, and a pet may be represented as corresponding numerical values. The game strategy guide providing apparatus may train the MLR model with the numerical information.

The game strategy guide providing apparatus may train the MLR model based on information collected for a predetermined period of time. For the training, information associated with a game character of each user, information as to whether each user succeeds in a mission in each game stage or in a fight with a counterpart target object, and the like may be used. The game strategy guide providing apparatus may train each MLR model based on a tribe to which each game character belongs, an attribute of each game character, a level, and the like.

A score associated with an achievement of a game goal may be determined by an MLR model as represented by Equation 1. Through the training, coefficients, for example, $\beta_0, \ldots \beta_N$, that define the MLR model may be determined.

$$y = \beta_0 + \beta_1 x_1 + \beta_2 x_2 + \ldots \beta_N x_N \qquad \text{[Equation 1]}$$

In Equation 1, y denotes a dependent variable, and indicates whether the game goal is achieved or not or the score.

In addition, $x_N$ denotes an independent variable in which N is a natural number greater than or equal to 1, and indicates values of all items that affect the achievement of the game goal. For example, $x_N$ may indicate values of an attack power, a defensive power, an attack speed, a life power, a recovery rate, and the like. For example, the game strategy guide providing apparatus may train the MLR model as represented by Equation 1 based on the data illustrated in FIG. 7. As a result of the training, an MLR model as represented by Equation 2 may be determined.

$$y=0.39+0.04x_1+1.14x_2+0.04x_3+0.04x_4+0.26x_5 \quad \text{[Equation 2]}$$

In Equation 2, a coefficient applied to $x_2$ is the greatest, and thus it is learned that a value of an item corresponding to $x_2$ affects the most the achievement of the game goal. The game strategy guide providing apparatus may calculate a score by applying state information of a game character of a user or adjusted state information to the MLR model determined as represented by Equation 2. For example, the game strategy guide providing apparatus may normalize, to be a value between 0 and 100, a value derived by applying, to Equation 2, each parameter forming an ability and an attribute of the game character, and determine the normalized value to be the score.

Figure 8:
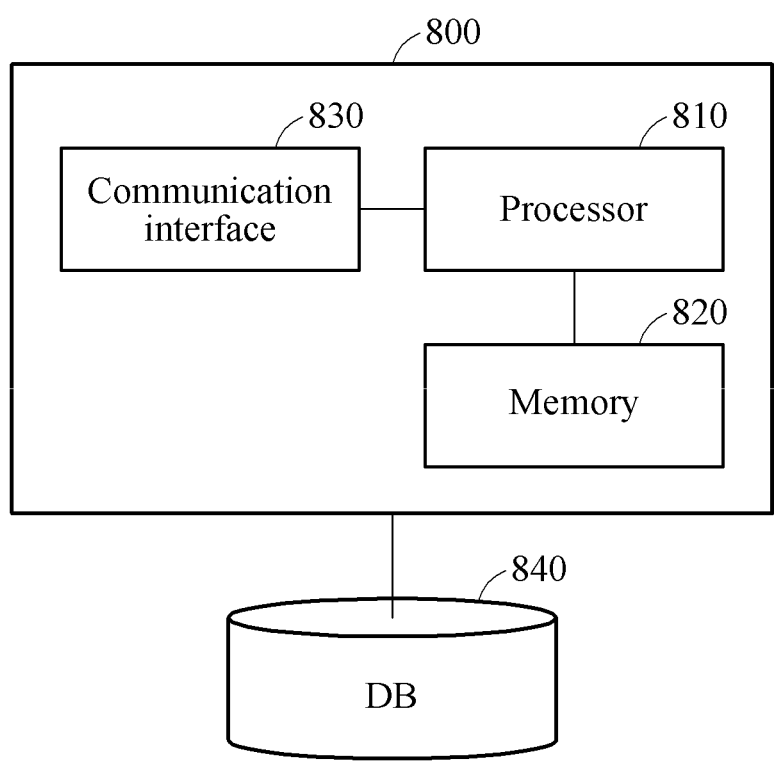
FIG. 8 is a diagram illustrating an example of an apparatus for providing a game strategy guide according to an example embodiment.

FIG. 8 is a diagram illustrating an example of a game strategy guide providing apparatus according to an example embodiment.

Referring to FIG. 8, a game strategy guide providing apparatus 800 includes a processor 810, a memory 820, and a communication interface 830. According to an example, the game strategy guide providing apparatus 800 may further include a DB 840. The game strategy guide providing apparatus 800 may correspond to a game strategy guide providing apparatus described herein, and operate by being included in the game server 110 illustrated in FIG. 1.

The memory 820 may be connected to the processor 810, and store instructions to be readable or executable by the processor 810, and data to be processed by the processor 810 or data processed by the processor 810. The memory 820 may include a non-transitory computer-readable storage medium, for example, a high-speed random-access memory (RAM), and/or a nonvolatile computer-readable storage medium, for example, at least one disk storage device, a flash memory device, and other nonvolatile solid-state memory devices.

The communication interface 830 may provide an interface for communication with an external device, for example, a user terminal. The communication interface 830 may communicate with the external device through a wired or wireless network.

The DB 840 may store information and data necessary for the game strategy guide providing apparatus 800 to operate. For example, the DB 840 may store game play information of users, training data to be used to train an MLR model, information associated with a game strategy guide interface, and the like.

The processor 810 may execute a function and an instruction to be performed in the game strategy guide providing apparatus 800, and control an overall operation of the game strategy guide providing apparatus 800. The processor 810 may provide a user with the game strategy guide interface. The processor 810 may perform one or more, or all of the operations or methods described above in relation to an operation of a game strategy guide providing apparatus with reference to FIGS. 1 through 7.

In an example, the processor 810 may provide the user with the game strategy guide interface including at least one adjustable parameter. When the parameter adjusted by a user input of the user is received from the user terminal, the processor 810 may calculate a score associated with an achievement of a game goal based on the adjusted parameter, and provide the user with information associated with the calculated score through the game strategy guide interface.

In this example, the processor 810 may calculate the score associated with the achievement of the game goal based on current state information of a game character of the user, and provide the user with the game strategy guide interface including the information associated with the calculated score. In an example, the processor 810 may select an MLR model corresponding to the game character of the user from among a plurality of pretrained MLR models, and calculate the score by applying the adjusted parameter to the selected MLR model.

When change information of the current state information of the game character is received from the user terminal, the processor 810 may recalculate the score based on the received change information. The processor 810 may recalculate the score by applying, to a pretrained MLR model, a parameter included in the change information, and transmit information associated with the recalculated score to the user terminal. The recalculated score may be displayed on the game strategy guide interface displayed on the user terminal.

Figure 9:
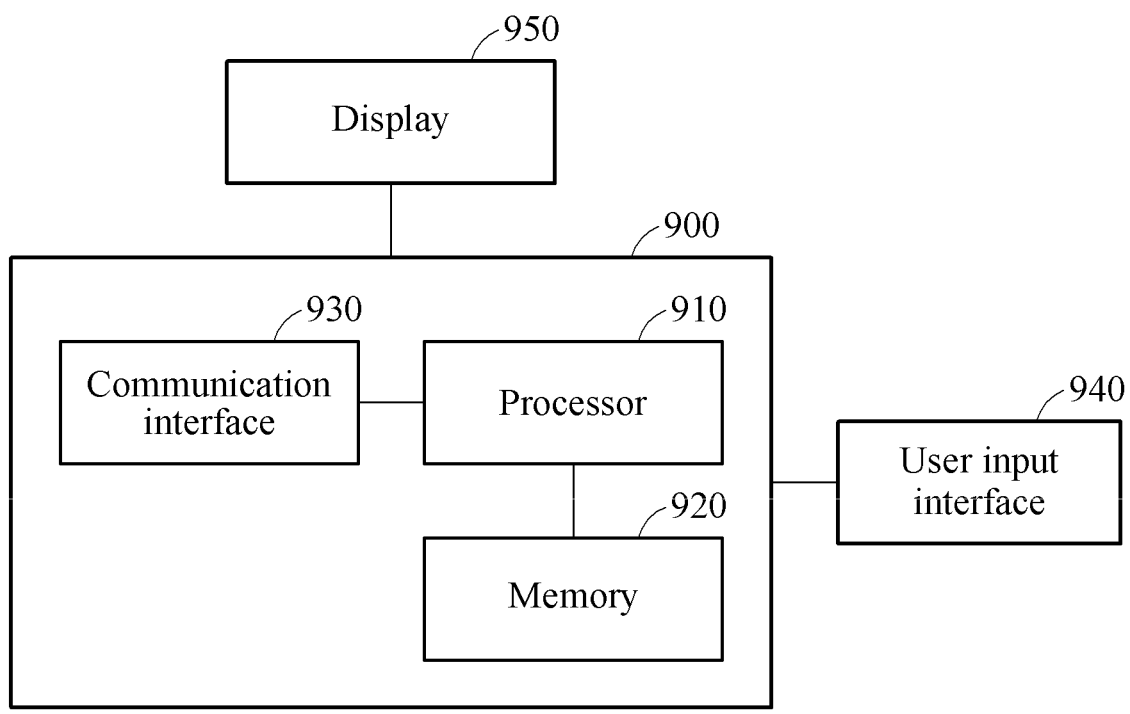
FIG. 9 is a diagram illustrating an example of a user terminal according to an example embodiment.

FIG. 9 is a diagram illustrating an example of a user terminal according to an example embodiment.

Referring to FIG. 9, a user terminal 900 includes a processor 910, a memory 920, and a communication interface 930. According to an example, the user terminal 900 may further include a user input interface 940 and a display 950. The user terminal 900 may be the same user terminal described herein.

The memory 920 may be connected to the processor 910, and store instructions to be readable or executable by the processor 910, and data to be processed by the processor 910 or data processed by the processor 910. The memory 920 may include a non-transitory computer-readable storage medium, for example, a high-speed RAM, and/or a nonvolatile computer-readable storage medium, for example, at least one disk storage device, a flash memory device, and other nonvolatile solid-state memory devices.

The communication interface 930 may provide an interface for communication with an external device, for example, a game server or a game strategy guide providing apparatus. The communication interface 930 may communicate with the external device through a wired or wireless network.

The user input interface 940 may receive a user input from a user. The user input interface 940 may receive text data, touch input data, and voice or speech data, for example. The display 950 may output a game play screen or display being executed by the processor 910. The display 950 may be a monitor or a touchscreen display, for example.

The processor 910 may execute a function and an instruction to be performed in the user terminal 900, and control an overall operation of the user terminal 900. For example, when the user terminal 900 receives a game strategy guide interface from the game strategy guide providing apparatus through the communication interface 930, the processor 910 may output the game strategy guide interface through the display 950. In addition, when the user adjusts an item on the game strategy guide interface, the processor 910 may transmit information associated with such adjustment to the game strategy guide providing apparatus through the communication interface 930.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of providing a game strategy guide, comprising:
   providing, by a processor, a user with a game strategy guide interface including at least one adjustable parameter;
   receiving, by the processor, a value of the parameter adjusted by a user input;
   training, by the processor, a multiple linear regression (MLR) model using numerical information to generate a pretrained MLR model;
   calculating, by the processor, a score associated with an achievement of a game goal based on the adjusted value of the parameter by applying the adjusted value of the parameter to the pretrained MLR model; and
   providing, by the processor, the user with information associated with the calculated score through the game strategy guide interface,
   wherein, when the value of the parameter is adjusted by the user input, the game strategy guide interface is configured to provide information associated with a change in a probability index indicating a probability of the achievement of the game goal based on the adjusted value of the parameter.

2. The method of claim 1, wherein the providing of the game strategy guide interface comprises:
   calculating the score associated with the achievement of the game goal based on current state information of a game character of the user; and
   providing the user with the game strategy guide interface including the information associated with the calculated score.

3. The method of claim 1, wherein the calculating of the score comprises:
   when state information of a game character of the user changes by the user input, calculating the score based on the changed state information.

4. The method of claim 1, wherein the calculating of the score comprises:
   selecting an MLR model corresponding to a game character of the user from among a plurality of pretrained MLR models; and
   calculating the score by applying the adjusted value of the parameter to the selected MLR model.

5. The method of claim 1, wherein the game strategy guide interface indicates therein current state information of a game character of the user,
   wherein the current state information of the game character includes information associated with at least one of an ability or an attribute of the game character.

6. The method of claim 1, wherein the game strategy guide interface includes at least one parameter selected from among a plurality of adjustable parameters based on a level of influence on the achievement of the game goal.

7. The method of claim 1, wherein the achievement of the game goal includes one of a completion of a game quest, a completion of a game mission, a success in a raid, a victory against a boss character, or a victory against a game character of another user, and the score indicates a probability value of a probability of achieving the game goal.

8. A non-transitory computer-readable storage medium storing instructions that, when executed by a processor, cause the processor to perform the method of claim 1.

9. A method of providing a game strategy guide, comprising:

calculating, by a processor, a score associated with an achievement of a game goal based on current state information of a game character of a user;

providing, by the processor, a user terminal of the user with a game strategy guide interface including at least one adjustable parameter associated with the calculated score;

receiving, by the processor, change information of the current state information from the user terminal and adjusting a value of the parameter by the change information;

training, by the processor, a multiple linear regression (MLR) model using numerical information to generate a pretrained MLR model;

recalculating, by the processor, the score based on the received change information by applying a parameter included in the change information to the pretrained multiple linear regression (MLR) model; and transmitting, by the processor, information associated with the recalculated score to the user terminal, wherein when the value of the parameter is adjusted by the change information, the game strategy guide interface is configured to provide information associated with a change in a probability index indicating a probability of the achievement of the game goal based on the adjusted value of the parameter.

10. The method of claim 9, wherein the calculating of the score comprises:

calculating the score based on the value of the parameter.

11. The method of claim 9, wherein the game strategy guide interface indicates therein the current state information of the game character of the user, wherein the current state information of the game character includes information associated with at least one of an ability or an attribute of the game character.

12. An apparatus for providing a game strategy guide, comprising:

by the processor, the processor is configured to:

provide a user with a game strategy guide interface including at least one adjustable parameter;

receive a value of the parameter adjusted by a user input;

train a multiple linear regression (MLR) model using numerical information to generate a pretrained MLR model;

calculate a score associated with an achievement of a game goal based on the adjusted value of the parameter by applying the adjusted value of the parameter to the pretrained MLR model; and provide the user with information associated with the calculated score through the game strategy guide interface, wherein, when the value of the parameter is adjusted by the user input, the game strategy guide interface is configured to provide information associated with a change in a probability index indicating a probability of the achievement of the game goal based on the adjusted value of the parameter.

13. The apparatus of claim 12, wherein the processor is configured to:

select an (MLR) model corresponding to a game character of the user from among a plurality of pretrained MLR models; and calculate the score by applying the adjusted value of the parameter to the selected MLR model.

14. The apparatus of claim 12, wherein the game strategy guide interface indicates therein current state information of a game character of the user, wherein the current state information of the game character includes information associated with at least one of an ability or an attribute of the game character.

15. The apparatus of claim 12, wherein the processor is configured to:

calculate the score associated with the achievement of the game goal based on current state information of a game character of the user; and provide the user with the game strategy guide interface including the information associated with the calculated score.

* * * * *